United States Patent [19]

Goldrian

[11] Patent Number: 5,793,227
[45] Date of Patent: Aug. 11, 1998

[54] SYNCHRONIZING LOGIC AVOIDING METASTABILITY

[75] Inventor: Gottfried Goldrian, Böblingen, Germany

[73] Assignee: International Business Machines Corporation, Armonk, N.Y.

[21] Appl. No.: 694,048

[22] Filed: Aug. 8, 1996

[30]  Foreign Application Priority Data

Aug. 10, 1995 [WO] WIPO ............ PCT/EP95/03170

[51] Int. Cl.[6] ........................................ H03L 7/00
[52] U.S. Cl. .................. 326/94; 326/93; 327/145; 327/198
[58] Field of Search .............. 326/93-98; 327/144-145, 327/198; 375/371, 373

[56]  References Cited

U.S. PATENT DOCUMENTS

| | | |
|---|---|---|
| 4,949,361 | 8/1990 | Jackson ............................ 375/371 |
| 5,008,904 | 4/1991 | Mangelsdorf et al. . |
| 5,034,967 | 7/1991 | Cox et al. . |
| 5,099,477 | 3/1992 | Taniguchi et al. ............... 327/144 |
| 5,256,912 | 10/1993 | Rios ................................. 327/144 |
| 5,548,620 | 8/1996 | Rogers ............................. 375/371 |

Primary Examiner—Jon Santamauro
Attorney, Agent, or Firm—Lily Neff

[57]  ABSTRACT

An apparatus and method for controlling and rectifying possible metastability situations having a first circuit with a first clock signal (CLOCK1) at a first clock rate and a second circuit with a second clock signal (CLOCK2) at a second clock rate, the second circuit having an input circuit coupled to the first circuit and receiving signals therefrom. A control circuit for controlling possible metastability situations arising in communication between the first circuit and the second circuit is also provided. The control circuit receives as input the first clock signal and the second clock signal and provides a shifting of at least one of the two clock signals, in such a way that a possible metastable state of the input circuit is avoided.

14 Claims, 8 Drawing Sheets

SYNCHRONIZING LOGIC AVOIDING METASTABILITY

FIELD OF THE INVENTION

The invention relates to an apparatus comprising a first circuit with a first clock signal at a first clock rate, and a second circuit with a second clock signal at a second clock rate, the second circuit comprising an input circuit coupled to the first circuit and receiving signals therefrom, and a method for controlling possible metastability situations in a communication between the first circuit and the second circuit.

PRIOR ART

In known data processing systems, data is typically transmitted via any kind of data communication means among computers and other devices within the data processing system or to other (external) systems. Each of these devices may operate at different clock rates. A sending device may operate at one clock rate while the receiving devices may operate at a different clock rate. Data clocked by a sending device at the sending device's clock rate will appear to the receiving device to be asynchronous. Input latches are commonly used by the receiving device to receive this asynchronous data and synchronise the data to the receiving device's clock.

When devices operating at different clock rates are coupled together an unstable state, or metastable state, may occur. If data is received in a device by an input latch during the setup time of the input latch, the input latch may not select the state. This situation is commonly referred to as an unstable, or metastable state. In general, metastable state in a trigger circuit defines a state in which the circuit remains for a finite period of time, and at the end of which it returns to a stable state without the application of a pulse.

However, this solution introduces a delay for all input data whether or not the data may cause a metastable state.

Signals crossing such 'asynchronous' clock boundaries have to be synchronized in such a way that the error rate caused by metastability is extremely low. A common solution for avoiding metastability has been to place several synchronizing latches in the signal path, e.g. to double latch all data input into the receiving device. The number of latches depends on the latch type, the synchronizing clock frequency, and the asynchronous data frequency. There exist latch types which are very insensitive to metastability. Only one or two of them are required in usual applications.

Figure 1:
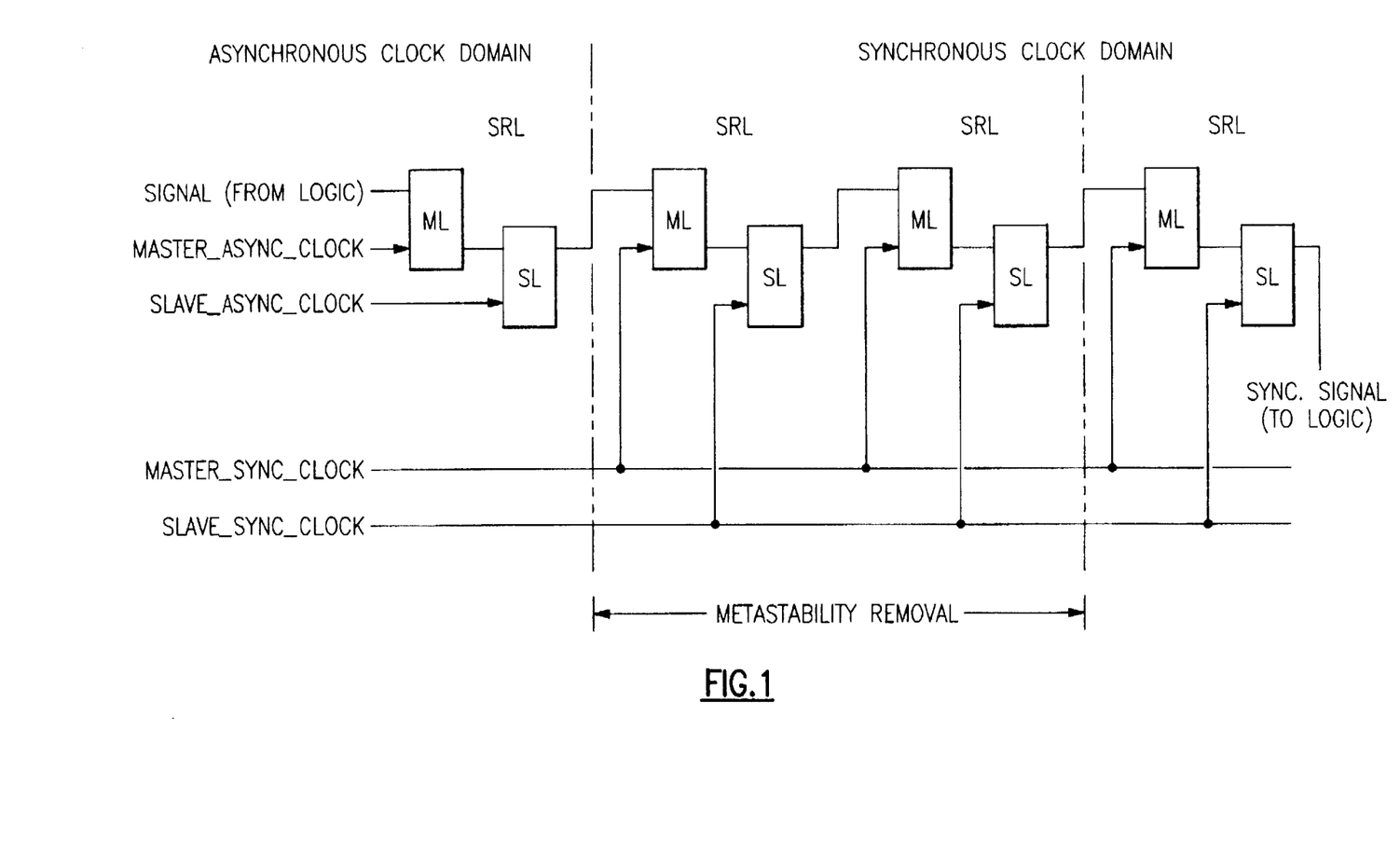
FIG. 1 shows a synchronizing method as known in the art.

In high performance asynchronous interfaces, the frequency of the synchronizing clock may be so high that, e.g. in minimum three latches are required to keep the mean time between errors (MTBE) acceptably high. This synchronizing method is shown in FIG. 1. Four Shift Register Latches SRL, each comprised of a Master Latch ML and a Slave Latch SL, are serially coupled at an 'asynchronous' clock boundaries between devices with different clock rates. The most left Shift Register Latch SRL is part of the sending logic, whereas the three most right Shift Register Latches SRL are part of the receiving logic. A signal at the input of the receiving device is regarded as asynchronous with respect to the synchronous clock domain within the receiving device.

The mean time between errors MTBE per synchronized signal in circuit according to FIG. 1 is more than 10.000 years. This is necessary if more than 1000 signals have to be synchronized in a complex computer system.

However, this solution introduces a delay for all input data whether or not the data may cause a metastable state. An additional latency is caused by the synchronizing latches especially if the synchronization has to occur several times within the critical path of a message transfer. In high performance interfaces this synchronizing delay may add more than 20% to the latency. Furthermore, parallel signals, such as a binary code, cannot be transferred across clock boundaries in a circuit of FIG. 1, because the parallel switching of the signals is not guaranteed.

From the US patent application Ser. No.: 962425 (internal reference No.: BC992063) by the same applicant, a method and a system for reducing metastability between devices is known. During the particular periods of time when metastability may occur, the processed data is input into a second device.

From the IBM Technical Disclosure Bulletin Vol. 23, No. 11, April 1981, pp. 5175–5176, a circuit for synchronizing two clocking systems in a particular clock transition using a minimum amount of logic and preventing metastability uncertainty is known. Data located in a register clocked by a clocking system A is to be written into a RAM clocked by a clocking system B.

Writing into the RAM is strictly controlled and can only occur during a positive transition of the system B master clock.

SUMMARY OF THE INVENTION

It is an object of the invention to provide an improved communication between devices having different clocking rates. The object of the invention is solved by the independent claims.

According to the invention an apparatus is provided comprising a first circuit with a first clock signal at a first clock rate and a second circuit with a second clock signal at a second clock rate, the second circuit comprising an input circuit coupled to the first circuit and receiving signals therefrom. The apparatus further comprises a control circuit for controlling possible metastability situations in an communication between the first circuit and the second circuit. The control circuit receives as input the first clock signal and the second clock signal and comprises means for providing a shifting of at least one of the both clock signals, or parts thereof, in such a way that a possible metastable state of the input circuit is avoidable.

A possible metastability situation in an apparatus according to the invention is controlled by monitoring the first clock signal and the second clock signal. When a possible metastability situation has been detected, at least one of the both clock signals, or parts thereof, is shifted in such a way that a possible metastable state of the input circuit can be avoided. Alternatively, when a possible metastability situation has been detected, at least one shifted one of the both clock signals, or parts thereof, is selected in order to avoid a possible metastable state.

The control circuit preferably comprises means for generating clock signals and means for suppressing clock signals, and/or means for delaying or advancing the at least one of the both clock signals, or the parts thereof, and/or means for delaying one of the at least one of the both clock signals, or the parts thereof, and advancing the other one of the at least one of the both clock signals, or the parts thereof.

Shifting of the at least one of the both clock signals, or parts thereof, is preferably accomplished by delaying or advancing the at least one of the both clock signals, or the parts thereof. Alternatively or additionally, the shifting can be carried out by delaying one of the both clock signals, or the parts thereof, and advancing the other one of the both clock signals, or the parts thereof.

In a preferred embodiment, wherein in a time sequence a first clock pulse of the first clock signal and a second clock pulse of the second clock signal may coincide in their timing so that a metastable state at the input circuit might occur, at least one of the first and second clock pulses is shifted in a way that a coincidence of the first and second clock pulses in the time sequence will be avoided. Either the first clock pulse or the second clock pulse can be delayed or advanced, or either the first clock pulse or the second clock pulse is delayed while the other one is advanced.

The invention can be used in any kind of circuit wherein asynchronous clocks can occur and wherein metastable states are expected.

According to the invention a logic circuit is provided which compares the clock, which is regarded as an asynchronous clock with respect the referred circuit, with the synchronizing clock of the referred circuit, to detect if there exists a possibility of a metastability. In this case the logic circuit delays the synchronizing clock by such an amount that no metastability can occur. Both clock signals (asynchronous and synchronizing clock) have to be available for the logic circuit.

The invention allows to reduce the signal path lengths between circuits with different clock rates. Particularly in latency critical operations such as data transfers in a handshake mode the communication performance can thus be improved.

DESCRIPTION OF THE DRAWINGS

The invention will now be described by way of example and with reference to the accompanying drawings in which:

FIG. 2b shows an embodiment of parts of the circuit in FIG. 2a,

GENERAL DESCRIPTION OF THE INVENTION

Figure 2A:
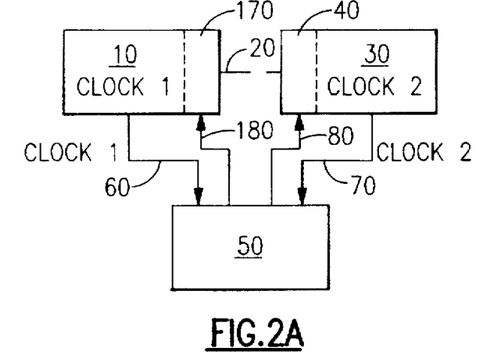
FIG. 2a shows a functional circuit according to the invention.

FIG. 2a shows a functional circuit according to the invention. A first circuit 10 with a clock signal CLOCK1 at a first internal clock rate provides a signal on a signal line 20 to a second circuit 30 with a clock signal CLOCK2 at a second internal clock rate. The second circuit 30 further comprises an input circuit 40 which might be embodied as input latches. A control circuit 50 for controlling metastability situations of the communication between the first circuit 10 and the second circuit 30 receives as input the clock signal CLOCK1 on a line 60 and the clock signal CLOCK2 on a line 70. The control circuit 50 monitors both clock signal CLOCK1 and CLOCK2. When the both clock signals CLOCK1 and CLOCK2 coincide in their timing so that a possible metastable state at the input circuit 40 might occur, the control circuit 50 provides a shifting of at least one of the both clock signals CLOCK1 and CLOCK2 in such a way that a metastable state will be avoided.

Figure 3:
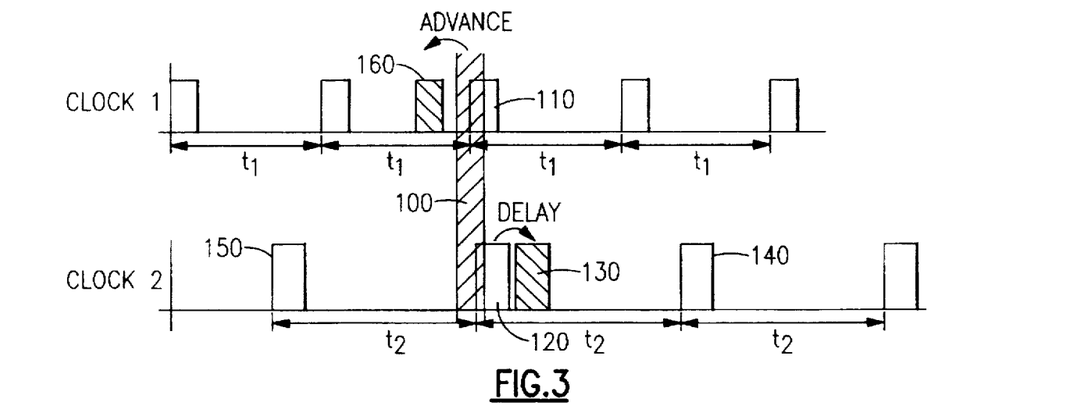
FIG. 3 shows a timing diagram which illustrates the clock signal shifting according to the invention.

FIG. 3 shows a timing diagram which illustrates the clock signal shifting according to the invention. Each clock pulse of the clock signal CLOCK1 follows the preceding clock pulse after a period of time t1. Accordingly, each clock pulse of the clock signal CLOCK2 follows the preceding clock pulse after a period of time t2. As apparent from FIG. 3, in a time sequence 100 a clock pulse 110 of the clock signal CLOCK1 and a clock pulse 120 of the clock signal CLOCK2 may coincide in their timing so that a metastable state at the input circuit 40 might occur. It is to be understood that the definition of the time sequence 100 e.g. depends on the actual circuit designs, the elements used in the circuits 10, 30 and 40 and their respective tolerances. As a consequence of the clock signals CLOCK1 and CLOCK2 coinciding in the time sequence 100, at least one of the clock pulses 110 and 120 has to be shifted in a way that a coincidence of the clock pulses 110 and 120 in the time sequence 100 will be avoided. As shown in FIG. 3, e.g. clock pulse 120 is delayed to a clock pulse 130. However, the clock rate—defined as 1/t2 —of the clock signal CLOCK2 is substantially maintained so that a clock pulse 140 as the next clock pulse after clock pulse 130 will follow a clock pulse 150 which was preceding the clock pulse 130 by a time of two times t2.

It is clear that in order to avoid possible metastability situations, also clock pulse 110 can be delayed. Accordingly, either one of the respective clock pulses can be advanced, or one of the clock pulses can be advanced and the other one delayed.

FIG. 3 illustrates the advancing of clock pulses. Clock pulse 110 which happens to coincide with the clock pulse 120 in the time sequence 100 is advanced to a clock pulse 160. Any combination of delaying and/or advancing the respective clock pulses can be used in order to avoid metastable states of the input circuit 40.

In the case that the control circuit 50 provides advanced and/or delayed clock signals to the first circuit 10, the first circuit in FIG. 2a comprises an output circuit 170 which receives the advanced and/or delayed clock signals from the control circuit 50 via a line 180. In the simplest embodiment of the invention, only one of either clock signal CLOCK1 or CLOCK2 is controlled by the control circuit 50, so that only one of the control circuit 50 controlled circuits, either input circuit 40 or output circuit 170, is necessary. However, in case that the two circuits 10 and 30 communicate in either directions, i.e. from circuit 10 to circuit 30 and vice versa, each one of circuits 10 and 30 requires a respective input circuit 40 and a respective output circuit 170. It is clear that, dependent on the actual embodiment of the input circuit 40 and the output circuit 170, a combined input/output circuit might be provided for each circuit 10 or 30.

The shifting operation of the at least one of the both clock signals CLOCK1 and CLOCK2, or parts of it, is preferably accomplished by directly providing shifted clock signals to the respective input 40 or output 170 circuits. The shifted clock signals are generated by the control circuit 50 and provided to the respective input and/or output circuits. The control circuit 50 in that case can be implemented by any circuit known in the art capable to delay and/or advance clock pulses. Instead of delaying or advancing the clock pulses, the clock pulses 160 or 130 can be generated by the control circuit 50 while the respective 'regular' clock pulses 110 or 120 are suppressed by any known circuit in the art.

Figure 2B:
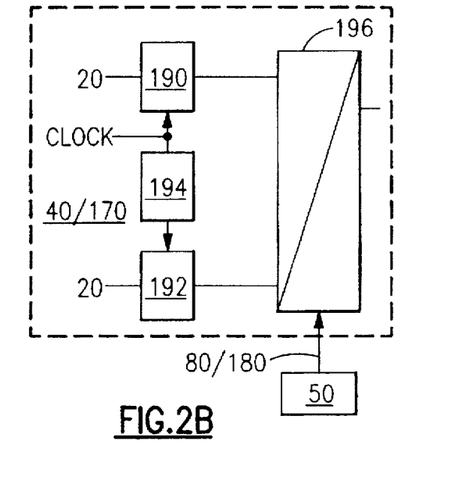

Another possibility for accomplishing the shifting operation of the at least one of the both clock signals CLOCK1 and CLOCK2, or parts of it, is shown in FIG. 2b. In that embodiment the control circuit 50 provides a selecting signal via the line 80 and/or line 180 to the respective input 40 and/or output 170 circuits. FIG. 2b shows a common structural embodiment for the input circuit 40 and the output circuit 170. A first input device 190 and a second input device 192 each receive the signal to be transferred on the signal line 20. The first and second input devices 190 and 192 are each connected to the respective internal clock signal (CLOCK1 or CLOCK2), whereby the first input device 190 directly receives the internal clock signal while the second input device 192 receives the clock signal through a shifting device 194. The shifting device 194 receives the internal clock signal and shifts the received clock signal by a predetermined amount which can either be a fixed amount or an amount controlled e.g. by the control means 50. The shifting provided by the shifting device 194 can be delaying or advancing in accordance to the above said. It is to be understood that the first and second input devices 190 and 192 are clock triggered devices, such as latches, which first allow their input signals to propagate through when a valid clock signal is applied.

Further in FIG. 2b, a selecting unit 196, which can be any kind of switching means or a multiplexer, receives the output signals from the first 190 and second 192 input device and a control signal provided by the control circuit 50 on the line 80 or 180 respectively. The control signal selects either the output from the first 190 or the second 192 input device as an output of the selecting unit 196. It is clear that the provision of the control signals for the selecting is in accordance with the above said. When the both clock signals CLOCK1 and CLOCK2 coincide in the time sequence 100 so that a possible metastable situation might occur, the control circuit 50 issues the control signal for selecting either the output of the un-shifted first input device 190 or the output of the shifted second input device 192. Preferably during normal operation the un-shifted first input device 190 is generally selected. Only in order to avoid a metastable state, the output of the shifted second input device 192 is selected.

Although the second input device 192, the shifting device 194 and the selecting device 196 of FIG. 2b are preferably located in the input circuit 40 and/or the output circuit 170, they can be regarded as part of the control circuit 50 since the result of their operation is analogous to the direct application of shifted signals to the input circuit 40 and/or the output circuit 170. In each case, at least one of the critical clock signals is shifted in order to avoid metastability. Whereas in the case of direct application of shifted clock signals the shifting is only done when a possible situation is detected, the shifting the case of FIG. 2b is applied continuously and only a selecting operation needs to be done when a possible situation is detected.

In case when more than two circuits with different clock rates are communicating and coupled together, the control circuit 50 needs to monitor all possible clock pulses according to the above said in order to avoid metastable states in the respective input circuits. The control circuit then receives all clock signals of the circuits to be controlled with respect to metastability and is further coupled to the respective input circuits of the circuits to be controlled.

Figure 4:
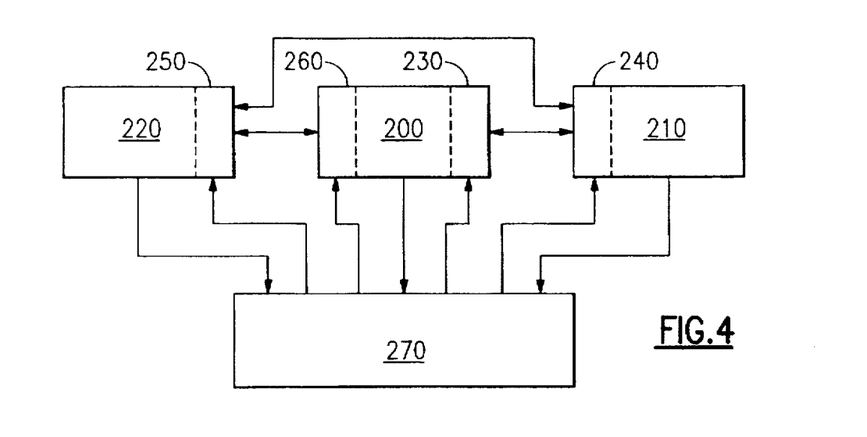
FIG. 4 shows an embodiment wherein a plurality of circuits, each with different clock rates, are coupled together for communication purposes.

FIG. 4 shows an embodiment wherein a plurality of circuits 200, 210 and 220, each with different clock rates, are coupled together for communication purposes. Circuit 200 comprises an input/output circuit 230 for receiving and sending signals to the circuit 210. Circuit 210 accordingly comprises an input/output circuit 240 for receiving and sending signals to the circuit 200 and to the circuit 220. Circuit 220 comprises an input/output circuit 250 for receiving and sending signals to the circuit 200 and to the circuit 210. Circuit 200 further comprises a second input/output circuit 260 for receiving and sending signals to the circuit 220. A general control circuit 270 receives the clock signals from the circuits 200, 210 and 220, respectively. Control circuit 270 generates control signals to each one of the input/output circuits 230-260. Possible clock coincidences which might lead to metastable states in any one of the input/output circuits 230-260 are detected by the control circuit 270 and advanced and/or delayed clock pulses are provided to the respective input/output circuits 230-260.

DETAILED DESCRIPTION OF EMBODIMENTS OF THE INVENTION

Many different implementations of the inventive concept can be thought within the scope of the invention. The following embodiment is based on SRLs (Shift Register Latches) as used in very large scale integrated circuits (VLSI). However, any other kind of latches or M/S flip-flops can be used accordingly.

Figure 5:
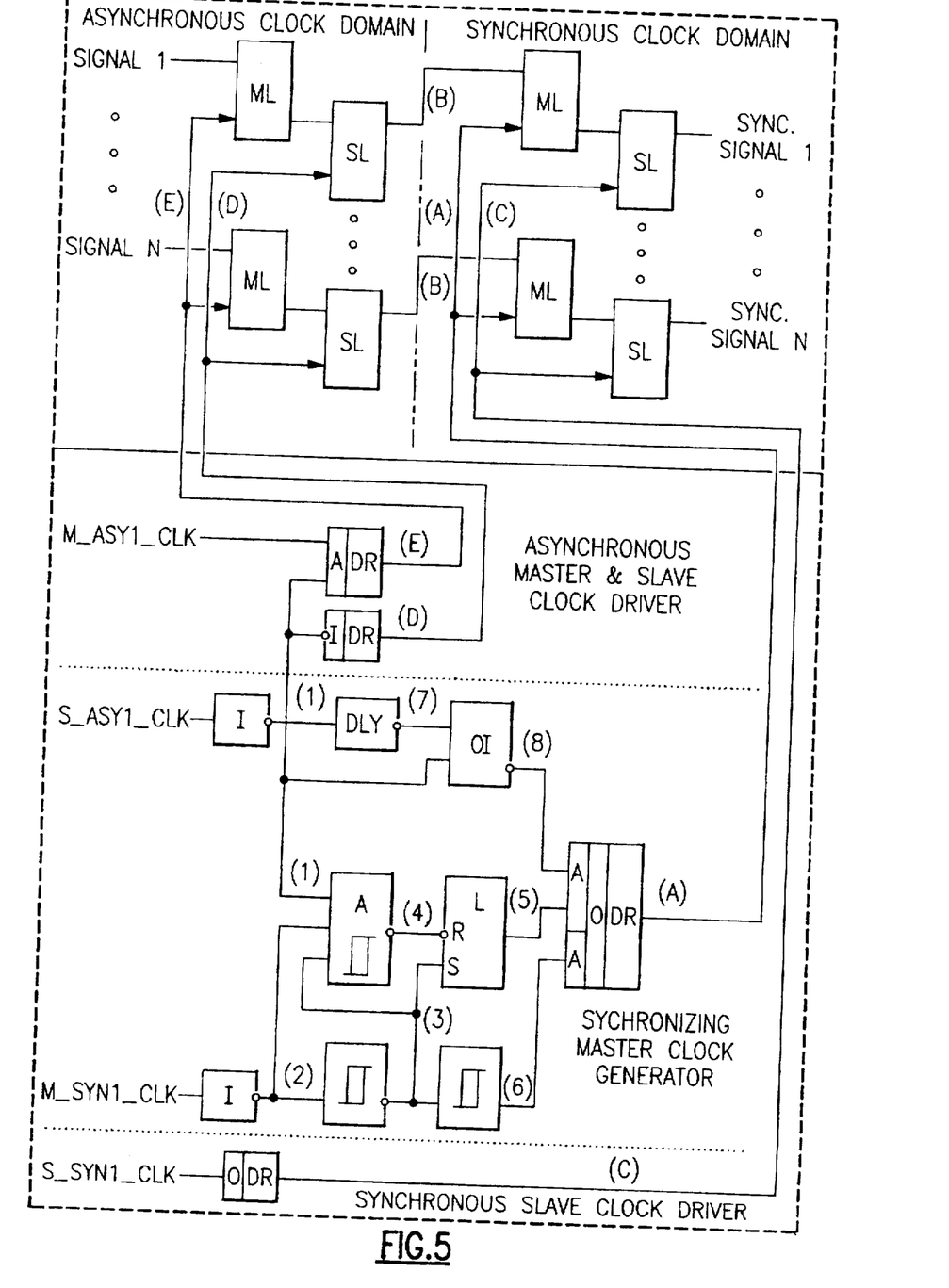
FIG. 5 shows a synchronizing logic of a first embodiment.

FIG. 5 shows a synchronizing logic of a first embodiment comprising:

- an N bit register with N master slave latches in an asynchronous clock domain,
- an N bit register with N master slave latches in a synchronous clock domain,
- a clock driver for the N latches in the asynchronous clock domain,
- a synchronizing master clock generator as a clock driver for the master latches in the synchronous clock domain which automatically adjusts the latching edge to a safe distance to the asynchronous signal transition, and
- a clock driver for the slave latches in the synchronous clock domain.

It is to be understood that the asynchronous clock domain may belong to the circuit 10 of FIG. 2a, while the synchronous clock domain may belong to the circuit 30. Accordingly, the synchronizing master clock generator could be part of the control circuit 50 in FIG. 2a.

The two registers are part of the logic in the two clock domains. The two registers should be placed close together at the clock boundary so that each asynchronous signal (B) has the same path length from the slave latch (SL) to its connected synchronizing master latch (ML).

When the signal path length (B) is known, the time related distance of the asynchronous signal transition to the latching function of the synchronizing latch is defined by the positive transition of the asynchronous slave clock (1) and the negative transition of the synchronous master clock (2). These two transitions are compared by the Synchronizing Master Clock Generator which delays the latching edge of the synchronous master clock (A) depending on the result of the comparison. To ensure that the positive transition of the asynchronous clock is the best possible representation of the asynchronous data transition, the asynchronous master clock is gated by the inverted slave clock in its clock driver. This method ensures that the asynchronous master clock never latches later than the positive transition of the slave clock which gates the data (B) to the output of the asynchronous slave latch (SL).

The clock drivers for the synchronous and asynchronous clocks are matched in their performance to allow a minimum clock skew. They represent logic gates with an integrated clock driver. Their inputs are parallel to the inputs of the last driver stage of the synchronous or asynchronous clock driver trees. Since the clock drivers of the last stage are usually heavily loaded (many SRL's in the VLSI), their typical delay is close to the slower clock drivers of the synchronizing logic. Therefore the adjustment of the clocks of the synchronizing logic to the clock distribution of the two clock domains is easily achievable as can be seen in the timing chart in FIG. 6.

Timing of the Synchronizing Clock Logic

Figure 6:
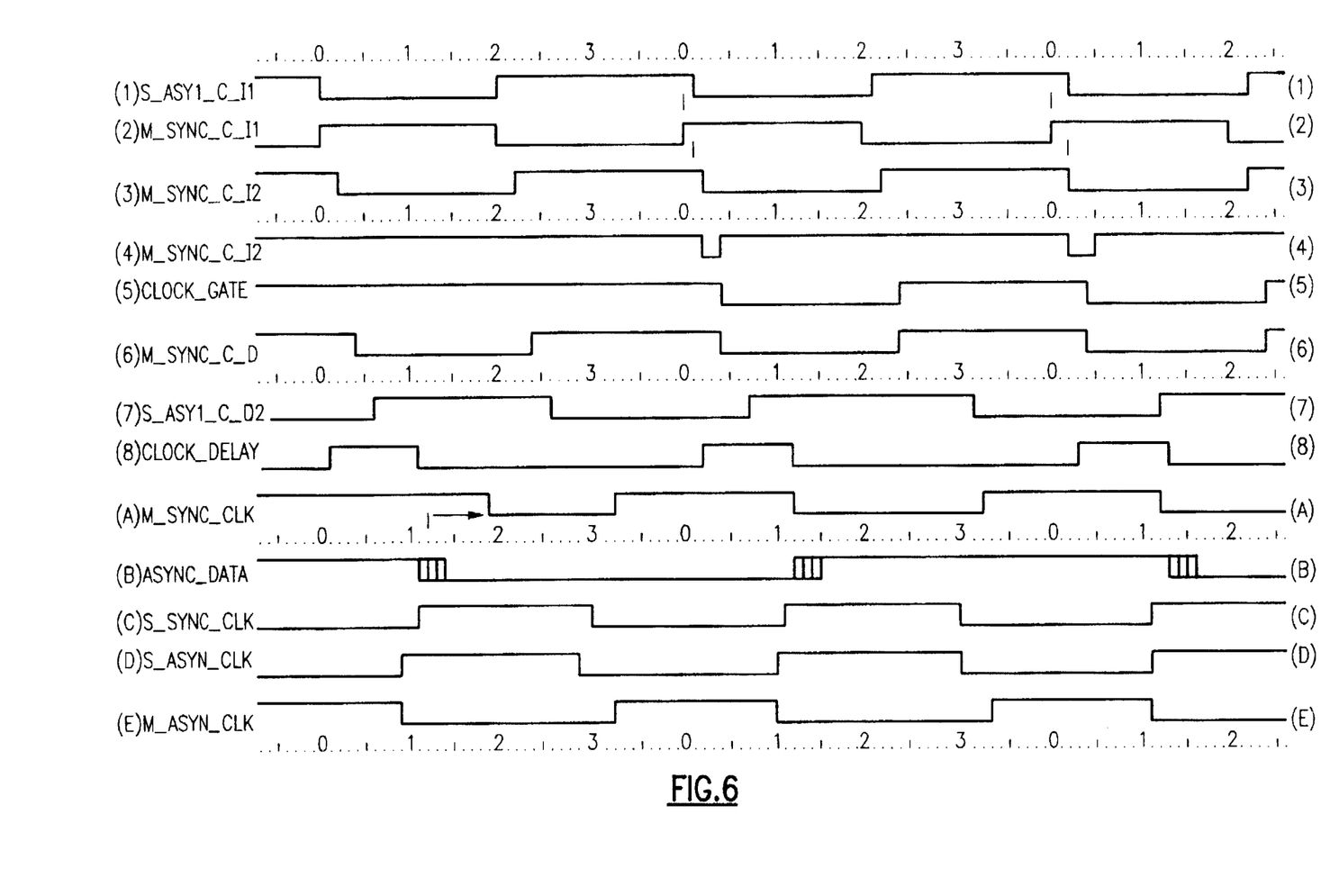
FIG. 6 shows the timing chart of the Synchronous Clock Logic of FIG. 5.

FIG. 6 shows the timing chart of the Synchronous Clock Logic of FIG. 5 which is based on the typical logic performance of 0.5 micron CMOS VLSI. In this example the cycle time of the synchronizing clock is 4 ns and the nominal safe distance from the asynchronous data transition (B) to the synchronizing master clock (A) is 0.7 ns. Also the total worst case skew of 0.3 ns relative to the master clock (A) is indicated in the time line (B) by 4 edges. The logic path length from 1 to 5 and from 2 to 6 is 0.4 ns and the delay of the clock drivers is assumed to be 0.8 ns. This absolute delay values are only exemplary in order to understand the invention. They can be higher or lower, however, the timing has to be adjusted as shown in the above example.

Description of the Synchronizing Master Clock Generator

Figure 7:
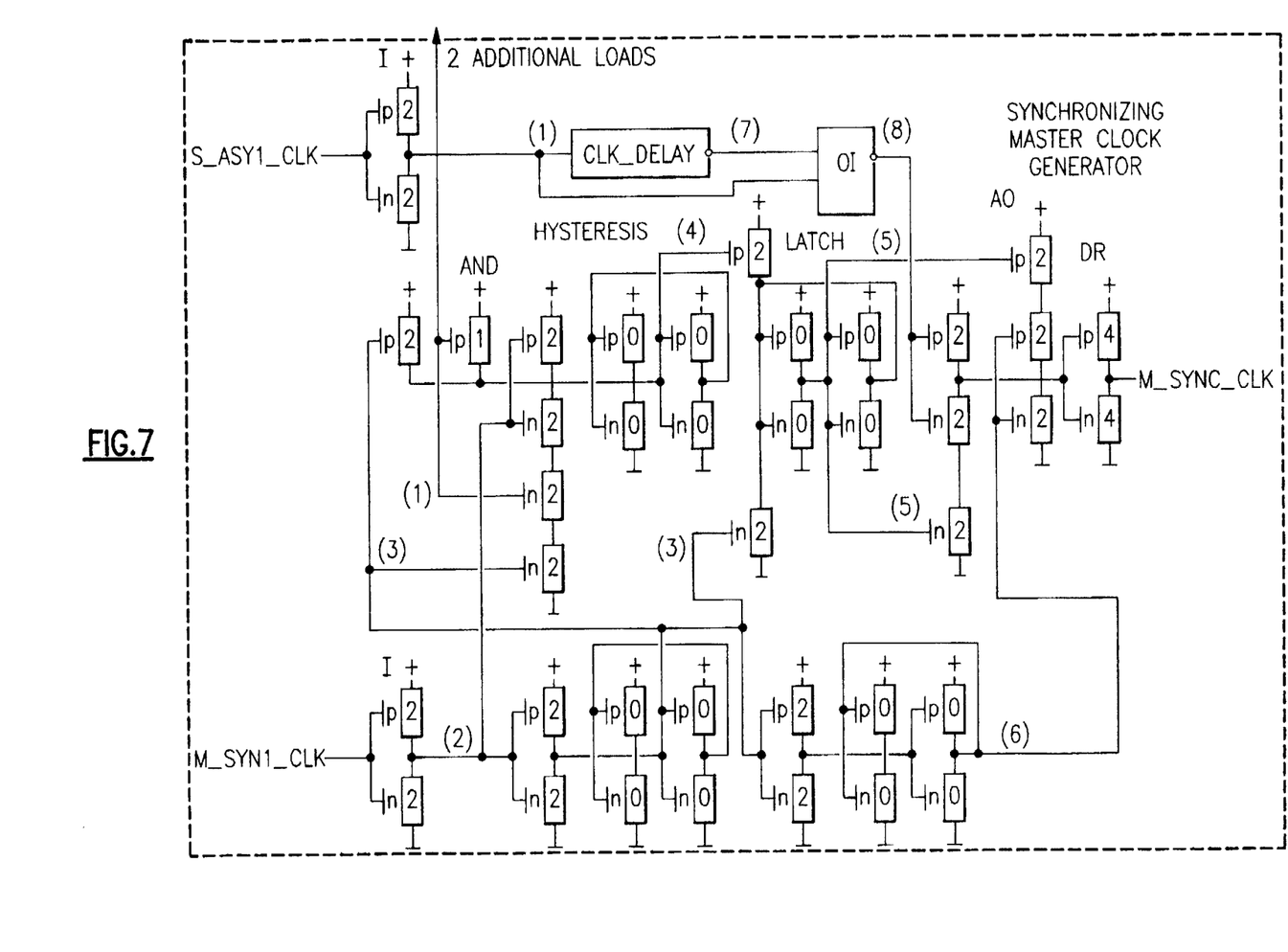
FIG. 7 shows a more detailed implementation of the Synchronizing Master Clock Generator of FIG. 5 as a VLSI macro device.

A logic schematic of the Synchronizing Master Clock Generator is shown in FIG. 5 and its respective timing diagram is depicted in FIG. 6. A more detailed implementation of the Synchronizing Master Clock Generator as a VLSI macro is shown in FIG. 7. As explained before the asynchronous slave clock (1) is compared to the synchronous master clock (2). If the negative transition of "1" is later than the positive transition of "2" than the following latch is reset. The output of the latch (L) is the Clock Gate (5) which is now disabling the Clock Delay (8). This is the situation where no danger of metastability exists for the synchronizing register. Therefore the latching edge of the clock (A) is not delayed. If, however, the negative transition of "1" is at the same time or later than the positive transition of "2" a danger of metastability may exist. In this case the latch (L) remains set and allows the Clock Delay (8) to be ORed to the synchronizing clock (A). Since the clock delay is generated from the asynchronous slave clock the additional delay to the latching edge of "A" is variable. It is not more than it is required to keep it to a safe distance of the asynchronous data transition. Therefore, the delay is only seen if the two clocks are in the critical distance. The critical distance is here defined by the delay from "1" to "8" (DLY+OI) minus the delay from "2" to "5". It includes the set-up time of the synchronizing latch and the total possible skew between the asynchronous data and the latching edge of the synchronous master clock. To keep the skew to a minimum the delay from "2" to "5" should be low and it should be very close to the delay from "2" to "6". Also the delays of the clock drivers should match. This can be achieved if the Synchronizing Logic with the exception of the registers is built in one VLSI macro and if the characteristics of the path "2–6" and path "2–5" matches. A possible match of the two paths is demonstrated in FIG. 7.

Detailed Schematic of the Synchronizing Master Clock Generator

In FIG. 7, the critical path in "2–5" is copied by the path "2–6". the same method should be applied to the Clock Delay. As described before, it includes the delay "2–5" and the data delay from the asynchronous slave clock (D) to the synchronous master latch. So the Clock Delay should contain the characteristics of these two paths plus the total possible skew. The skew is the sum of all tracking tolerances of the appropriate clock and data paths of the Synchronizing Logic. The delay of the OI ("7–8") may be sufficient for the skew delay.

Metastability-Free Synchronizing Master Clock Generator

The means for keeping metastability from the latch (L) in the logic path from "4" to "5" is indicated in FIG. 7. The comparison of the clocks "1" and "2" is done with an AND-Gate with a hysteresis. Also the slopes of the compared clock edges are controlled by the input inverters in such a way that the AND is switched on relatively fast by "2" but is switched off in slower speed by "1". The reason is the much heavier load on "1" and the smaller P-channel FET in the AND. The channel width of the P- and N-channel FETs with comparable performance is indicated with the numbers 0 to 4 where 0 stands for a very small channel and 4 for the widest one.

By selecting the adequate FETs the hysteresis can be adjusted so that the reset (4) to the Latch will only occur after the negative threshold of the hysteresis has been crossed. Even if clock "2" was only able to just make it because clock "1" is driving "4" back to the positive threshold, the time between the thresholds is long enough to reset the latch under all conditions. The slower slope of "1" helps to find the optimal operation point.

Second Embodiment of the Synchronizing Logic

Figure 8:
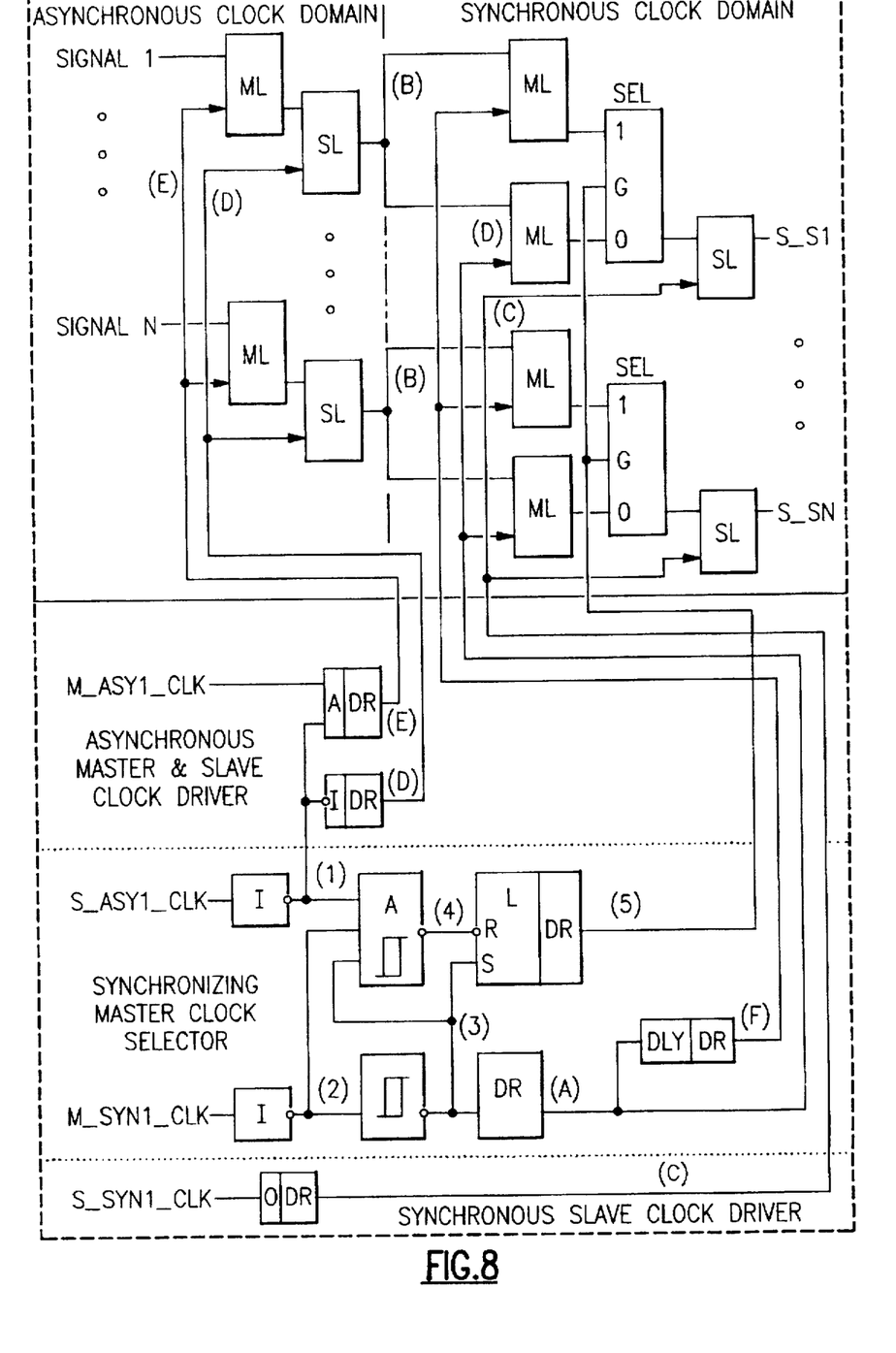
FIGS. 8–10 show a second embodiment of the Synchronizing Logic.
Figure 9:
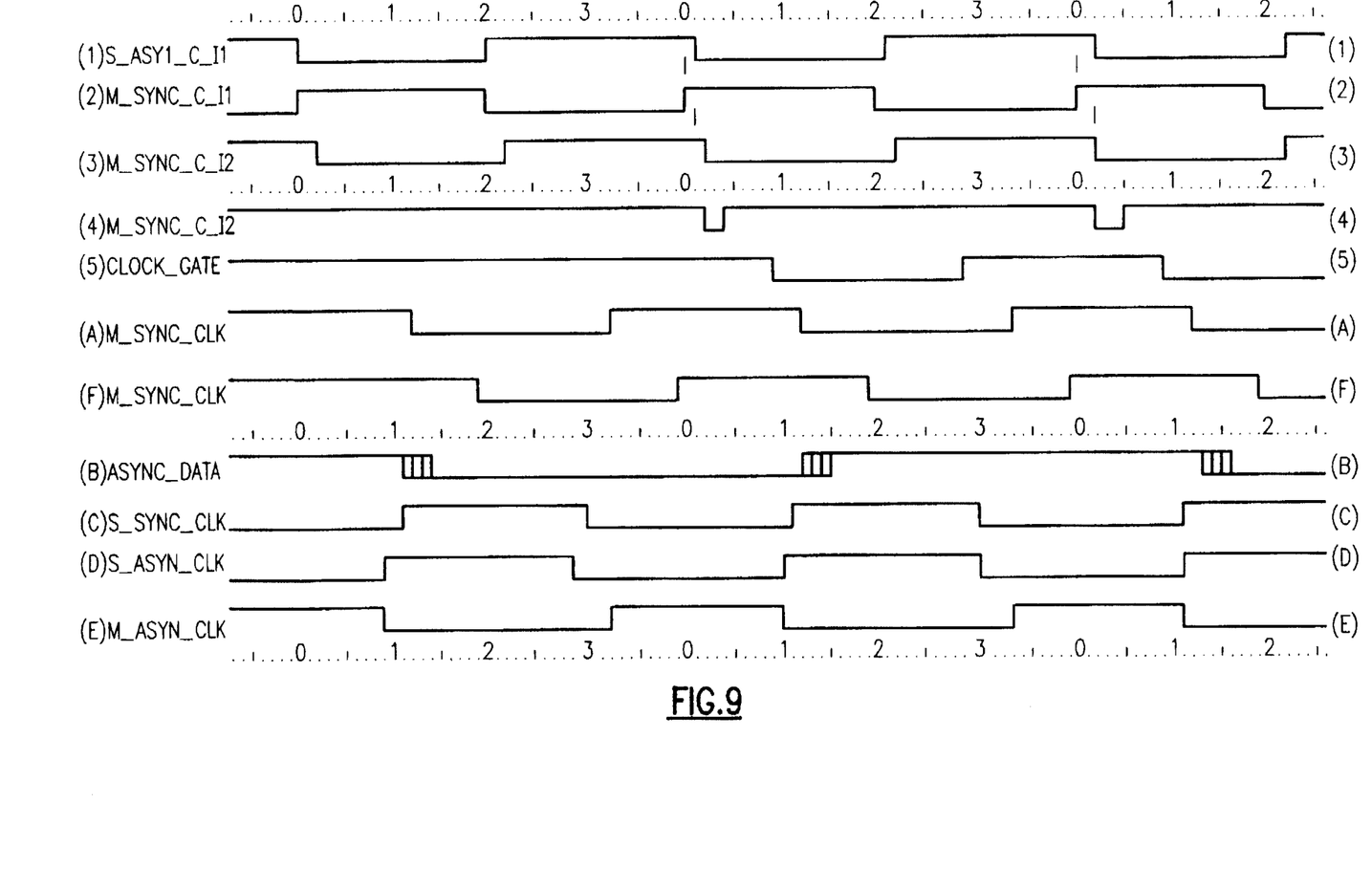
Figure 10:
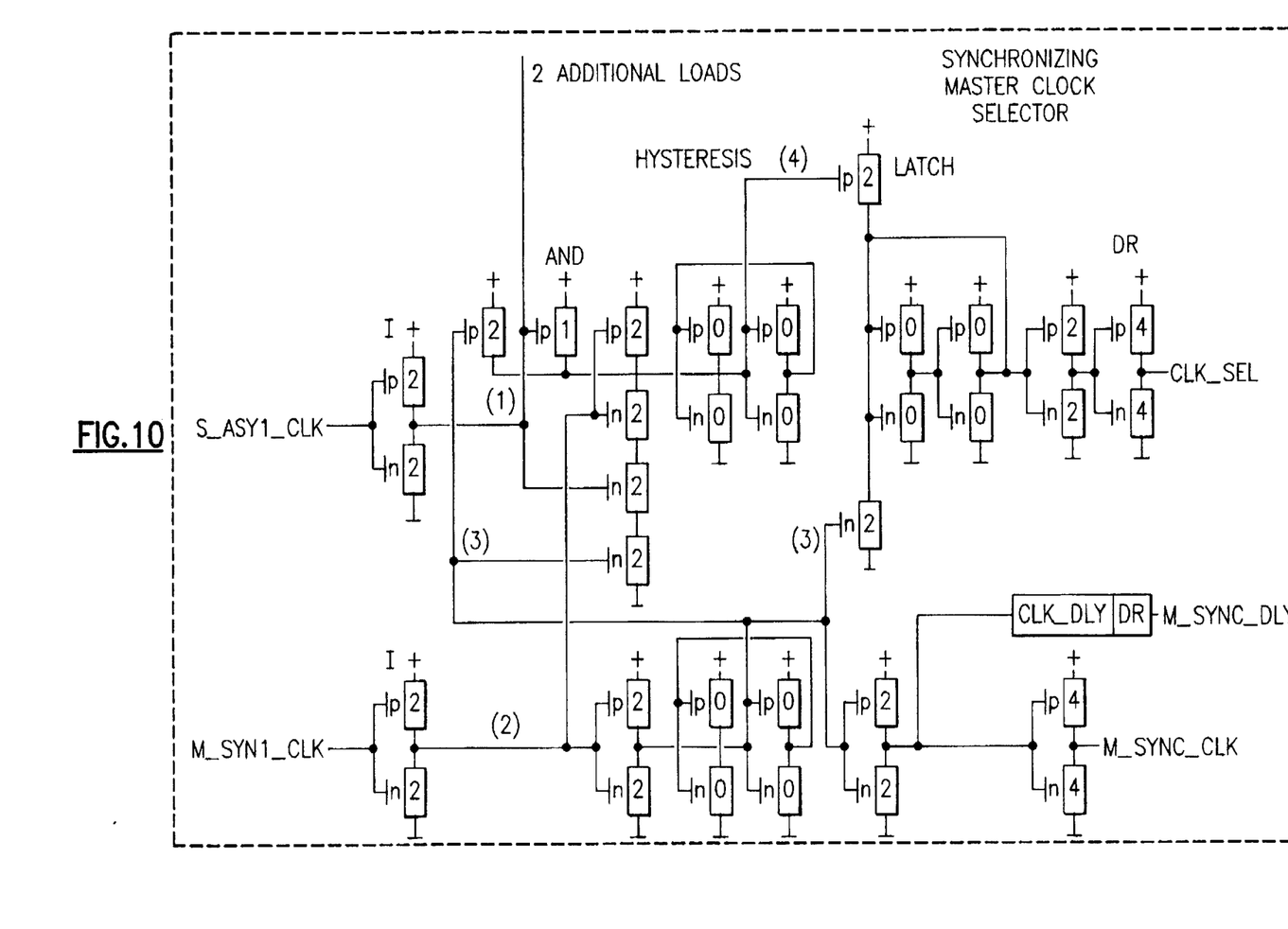

FIGS. 8–10 show a second embodiment of the Synchronizing Logic. The difference of this version to the first one is a special built SRL where two master latches are connected to a slave latch via a switch. This SRL requires more transistors than a normal SRL and if many of Synchronizing SRLs have to be used, this version might be more expensive. The advantage of this version is that there is more time available to react to a critical metastability situation. The master latch where the data had been latched safely (no danger of metastability) can now be selected at the later time point, just before the slave latch has to store it.

Two synchronizing clocks are generated for these two master latches. One clock (F) is delayed to the other one (A). This delay is the sum of all delay tolerances of the data and the control path of this data synchronization plus a safety margin to guarantee a safe distance to the metastability point. The master latch which is connected to the clock A is selected normally. Only if the danger of metastability is detected by the Synchronizing Master Clock Selector the master latch connected to the delayed clock F is selected.

The Synchronizing logic in FIG. 8 comprises a register with N SRLs in the asynchronous clock domain, a register with N SRLs in the synchronous clock domain where each SRL consists of two master latches (ML), a selector (SEL) and one slave latch (SL), whereby the selector for the synchronizing master latches selects the master latch which samples the data in a safe distance to the asynchronous signal transition, clock drivers for the SRLs in the asynchronous clock domain, a clock driver for the SLs in the synchronous clock domain, and the Synchronizing Master Clock Selector supplying also the clock drivers for the MLs in the synchronous clock domain.

Timing of the Synchronizing Clock Logic

A logic schematic of the Synchronizing Master Clock Selector is shown in FIG. 8 and its timing diagram is depicted in FIG. 9. A more detailed implementation of it as a VLSI macro is shown in FIG. 10. As explained before the asynchronous slave clock (1) is compared to the synchronous master clock (2). If the negative transition of "1" is later than the positive transition of "2" than the following latch is reset. The output of the latch (L) is the Clock Select (5) which is now selecting the un-delayed synchronizing master clock (A). This is the situation where no danger of metastability exists for the synchronizing register. If, however, the negative transition of "1" is at the same time or later than the positive transition of "2" a danger of metastability may exist. In this case the latch (L) remains set and selects the delayed synchronizing master clock (F) which has a safe distance to the transition of the asynchronous data (B).

I claim:

1. An apparatus for controlling possible metastability situations comprising:

a first circuit having a first clock signal at a first clock rate;, a second circuit having a second clock signal at a second clock rate, said second circuit having an input circuit coupled to said first circuit and receiving signals therefrom;

a control circuit for controlling possible metastability situations in any communication between said first circuit and said second circuit, such that said control circuit receives as input said first clock signal and said second clock signal and provides means for a shifting of at least one of said first and second clock signals in such a way that a possible metastable state of said input circuit is avoidable; and said control circuit also having means for generating clock signals and means for suppressing clock signals.

2. The apparatus of claim 1, wherein said control circuit further comprises means for selecting at least one of said shifted clock signals.

3. The apparatus of claim 1, wherein said first circuit further comprises an output circuit coupled to said control circuit, for shifting said first clock signal.

4. The apparatus of claim 1, wherein said shifting means further comprises a first means for delaying or advancing of at least one of said first and second clock signals.

5. The apparatus of claim 4, wherein said shifting means further comprises a second means for delaying one of said first and second clock signals, and means for advancing said remaining one of said first and second clock signals.

6. The apparatus of claim 1, wherein said first and second circuits further comprise a respective input circuit and a respective output circuit, or a combined input/output circuit.

7. A method for controlling possible metastability situations occurring in the communication between a first circuit and a second circuit, said first circuit having a first clock signal at a first clock rate and said second circuit having a second clock signal at a second clock rate; comprising the steps of:

receiving signals by providing said second circuit with an input circuit coupled to said first circuit;

providing a control circuit including means for generating clock signals and means for suppressing clock signals; and controlling and monitoring any possible metastability situations in all communications between said first circuit and said second circuit, through said control circuit so that when a possible metastability situation has been detected, a shifting of at least one of said first and second clock signals will ensue in such a way that a possible metastable state of the input circuit can be avoided.

8. The method of claim 7, wherein the step of providing a shifting of said first or second clock signals, further comprises the step of delaying or advancing at least one of first or second clock signals.

9. The method of claim 7, wherein the step of providing a shifting of at least one of said first and second clock signals further comprises the step of delaying one said first or second clock signals and Advancing said remaining the said first or second clock signals.

10. The method claim 7, wherein the step of providing a shifting of the at least one of said first and second clock signals further comprises the step of selecting at least one of said first or second clock signals.

11. The method of claim 7, wherein in a time sequence a first clock pulse of said first clock signal and a second clock pulse of said second clock signal may coincide in their timing so that if a metastable state at said input circuit shall occur, at least one of said first and second clock pulses is shifted in a way that a coincidence of said first and second clock pulses in said time sequence will be avoided.

12. The method of claim 11, wherein either said first clock pulse or said second clock pulse is either delayed or advanced accordingly.

13. The method of claim 12, wherein the definition of said time sequence depends on actual circuit designs and elements used in said first and second circuits and their respective tolerances.

14. The method of claim 12, wherein said first clock pulse or said second clock pulse is delayed while said other clock pulse one is advanced.

* * * * *